(12) United States Patent
Kim et al.

(10) Patent No.: US 7,804,555 B2
(45) Date of Patent: Sep. 28, 2010

(54) LIQUID CRYSTAL DISPLAY DEVICE AND MOBILE STATION HAVING THE SAME

(75) Inventors: Sung Ho Kim, Suwon-shi (KR); Hyun Ha Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 443 days.

(21) Appl. No.: 11/720,237

(22) PCT Filed: Jan. 18, 2006

(86) PCT No.: PCT/KR2006/000197
§ 371 (c)(1),
(2), (4) Date: May 25, 2007

(87) PCT Pub. No.: WO2006/078118
PCT Pub. Date: Jul. 27, 2006

(65) Prior Publication Data
US 2008/0013013 A1    Jan. 17, 2008

(30) Foreign Application Priority Data
Jan. 21, 2005    (KR) .................... 10-2005-0005693

(51) Int. Cl.
G02F 1/1335    (2006.01)
(52) U.S. Cl. ................... 349/63; 349/74; 349/86
(58) Field of Classification Search ............... None
See application file for complete search history.

(56) References Cited
U.S. PATENT DOCUMENTS 5,796,451 A    8/1998    Kim
6,825,898 B2 *    11/2004    Kobayashi et al. ............ 349/95
7,002,649 B2 *    2/2006    Yuuki et al. .................. 349/114
2003/0231268 A1    12/2003    Chen et al.
2005/0001796 A1    1/2005    Liu

FOREIGN PATENT DOCUMENTS

CN    1470045    1/2004
JP    2003-004905    1/2003

(Continued)

OTHER PUBLICATIONS

Office Action dated Jul. 18, 2008 in Chinese Application No. 200680001036.5, filed Jan. 18, 2006.

*Primary Examiner*—Richard H Kim
(74) *Attorney, Agent, or Firm*—Birch, Stewart, Kolasch & Birch, LLP

(57) ABSTRACT

An LCD includes a transmissive liquid crystal panel, a front light unit placed in front of the transmissive liquid crystal panel and providing light for image display, and a light control unit placed at the rear of the transmissive liquid crystal panel and reflecting or transmitting incident light. A mobile station includes: an LCD having a transmissive liquid crystal panel, a front light unit placed in front of the transmissive liquid crystal panel and providing light for image display and a light control unit placed at the rear of the transmissive liquid crystal panel and reflecting or transmitting incident light, a communication unit for communicating with an exterior, and a control unit controlling the communication unit and the image display of the LCD.

28 Claims, 4 Drawing Sheets

FOREIGN PATENT DOCUMENTS

| | | |
|---|---|---|
| JP | 2004-145332 | 5/2004 |
| JP | 2004-287436 | 10/2004 |
| JP | 2005-121998 | 5/2005 |
| KR | 10-0373310-0000 | 2/2003 |
| KR | 10-2003-0046517 | 6/2003 |
| KR | 10-2004-0055340 | 6/2004 |
| KR | 10-2004-0098492 | 11/2004 |
| WO | WO 95/14255 | 5/1995 |
| WO | WO 02/071131 | 9/2002 |

\* cited by examiner

[Fig. 1]
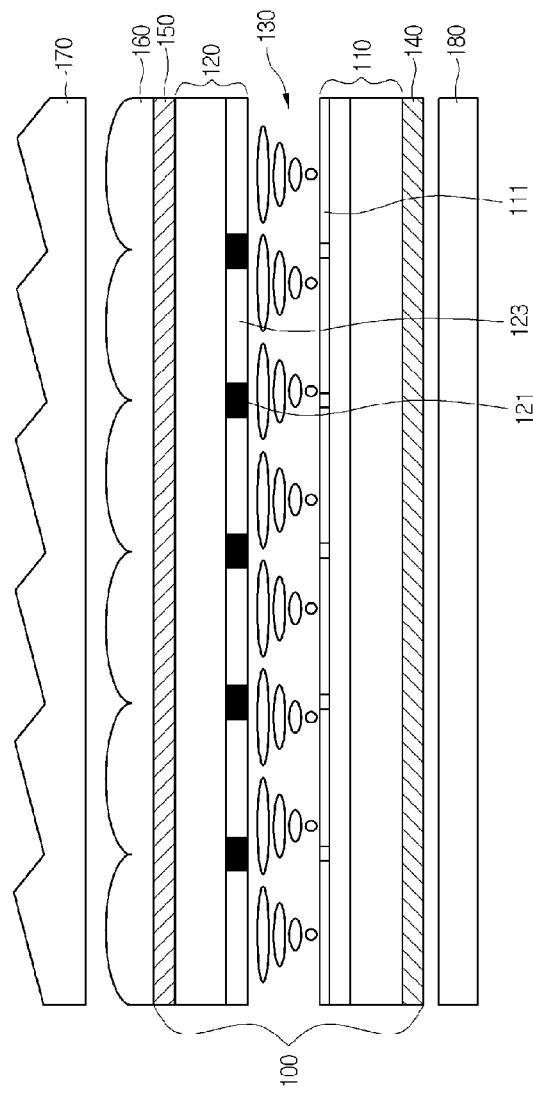
[Fig. 2]
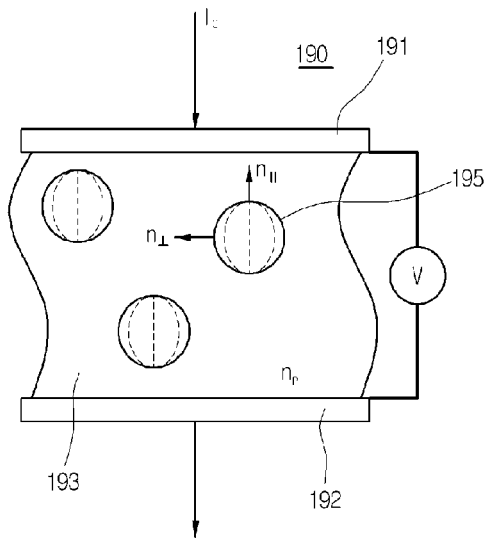

[Fig. 3]
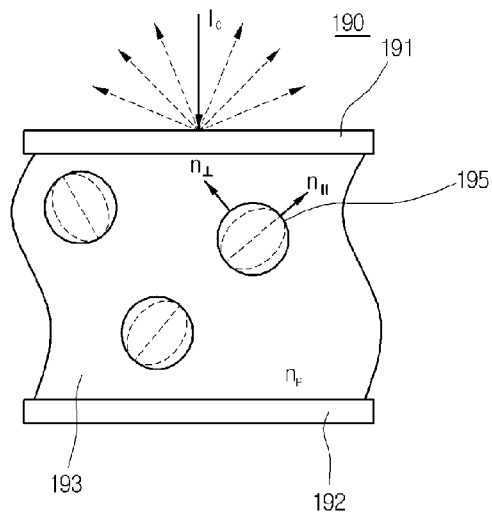
[Fig. 4]
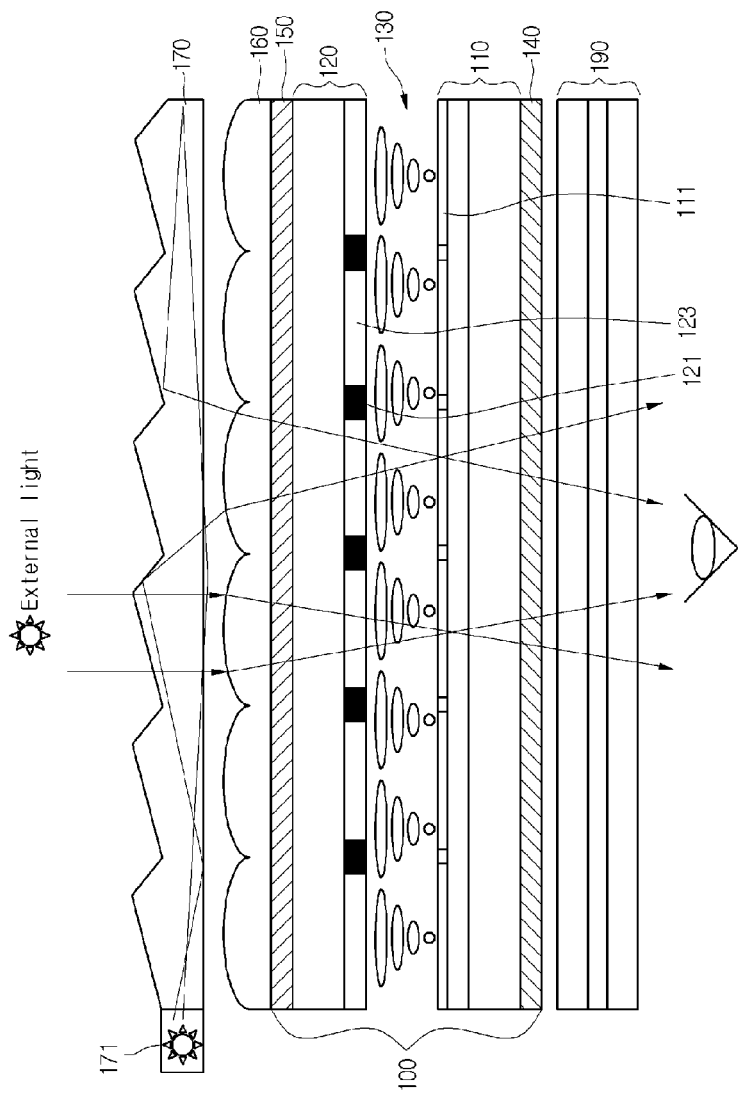

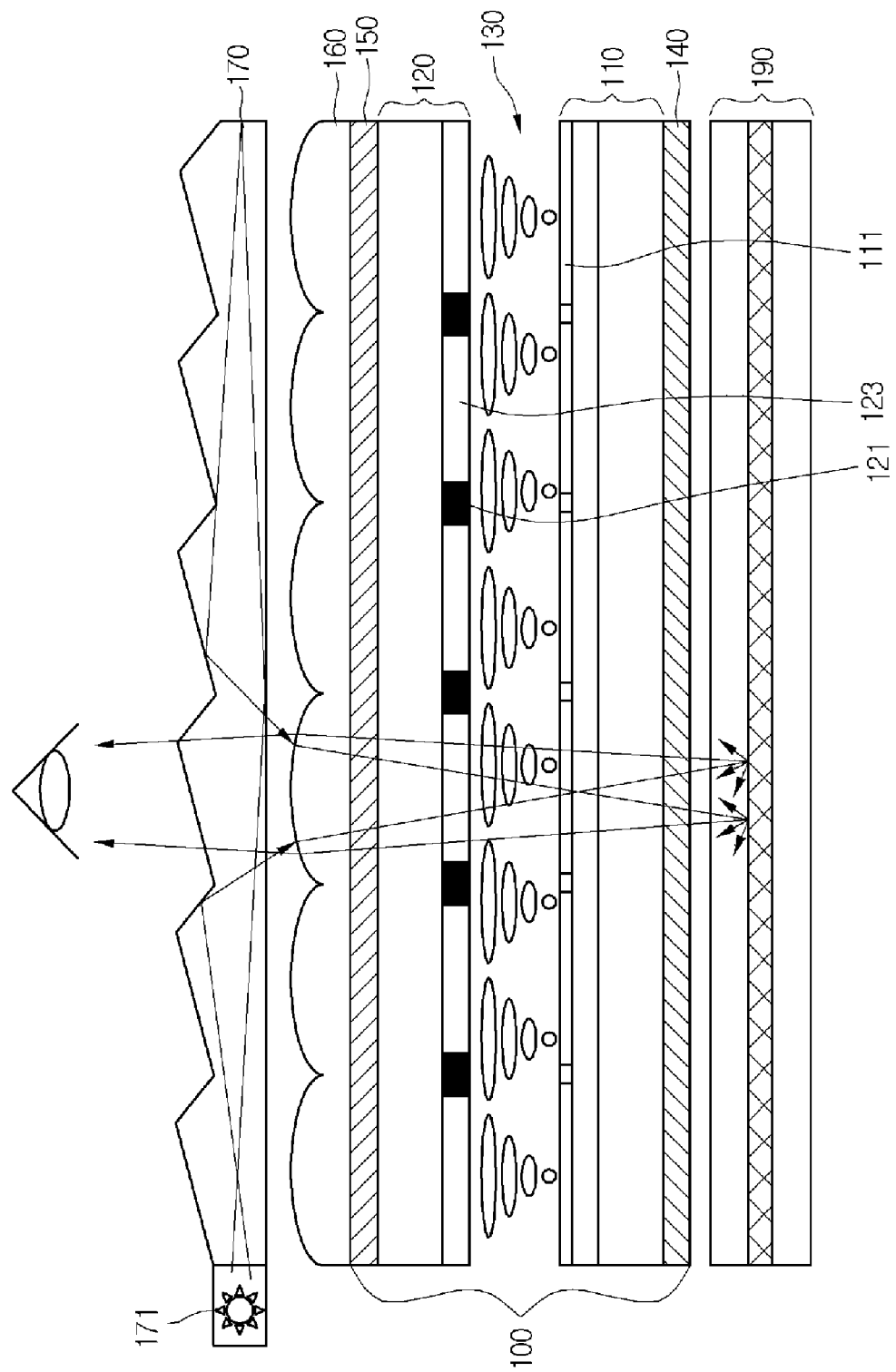
[Fig. 5]

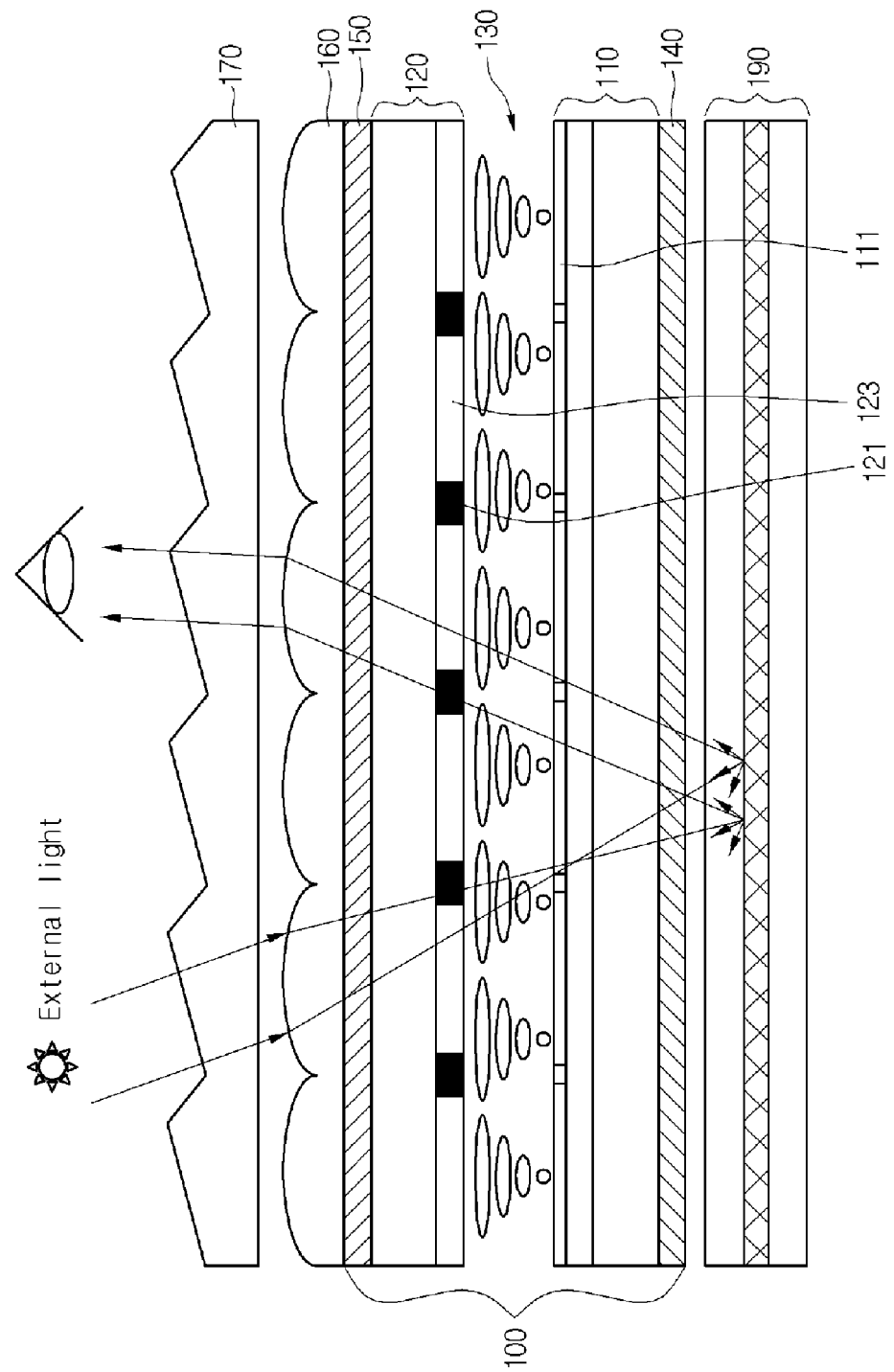
[Fig. 6]

though the transmissive liquid crystal panel. Also, there is provided a mobile station including: an LCD having a transmissive liquid crystal panel, a front light unit placed in front of the transmissive liquid crystal panel and providing light for image display, and a light control unit placed at the rear of the transmissive liquid crystal panel and reflecting or transmitting incident light; a communication unit for communicating with an exterior; and a control unit controlling the communication unit and the image display of the LCD.

LIQUID CRYSTAL DISPLAY DEVICE AND MOBILE STATION HAVING THE SAME

CROSS-REFERENCE TO RELATED APPLICATION

This application is the U.S. national stage application of International Patent Application Ser. No. PCT/KR2006/000197, filed Jan. 18, 2006, the disclosure of which is hereby incorporated by reference in its entirety.

TECHNICAL FIELD

The present invention relates to a liquid crystal display device, and to a liquid crystal display device and a mobile station having the same, capable of dual image display on front and rear sides of a liquid crystal panel by using one transmissive liquid crystal panel.

BACKGROUND ART

Among display devices for displaying image information on a screen, a Braun tube display device (or, cathode ray tube(CRT)) has been most popularly used up to date. However, the CRT has several disadvantages that it is bulky and heavy in comparison with its display area.

Accordingly, a thin film type flat panel display device, which can be easily used anywhere because of its slimness, has been developed, and is gradually substituting the Braun tube display device.

The principles of the optical anisotropy and polarization of liquid crystals are employed in driving such a LCD. Because liquid crystal has an elongate structure, it has a direction and a polarizability of a molecule array. The direction of the molecule array can be controlled by artificially applying an electric field to the liquid crystal. When the alignment direction is controlled by such an electric field, a light is transmitted or blocked according to the alignment direction of the liquid crystal molecules due to the optical anisotropy of the liquid crystal, thereby displaying colors and images.

In an active matrix LCD, an active device with a nonlinear characteristic is added into each of pixels arranged in a shape of matrix. Thus, an operation of each pixel is controlled using a switching characteristic of this device.

Meanwhile, in recently, various researches for a dual display have been undertaken, which is capable of displaying an image in both front and rear of LCD.

DISCLOSURE OF INVENTION

Technical Problem

The present invention is to provide an LCD capable of dual image display on front and rear sides of an liquid crystal panel by using one transmissive liquid crystal panel.

Also, the present invention is to provide a thin mobile station capable of dual image display by using an LCD adopting one transmissive liquid crystal panel.

Technical Solution

There is provided an LCD including: a transmissive liquid crystal panel; a front light unit placed in front of the transmissive liquid crystal panel and providing light for image display; and a light control unit placed at the rear of the transmissive liquid crystal panel and reflecting or transmitting incident light.

Advantageous Effects

According to the LCD of the present invention, there is an advantage that it can display an image in both front and rear of a liquid crystal panel using one transmissive liquid crystal panel.

Also, according to the mobile station of the present invention, there is another advantage of providing a slim mobile station capable of displaying an image on both surfaces of a liquid crystal panel, using the LCD in which one transmissive liquid crystal panel is employed.

BRIEF DESCRIPTION OF THE DRAWINGS

FIG. 1 is a conceptual view illustrating construction of an LCD according to the present invention.

FIG. 2 is a view illustrating an operation when a voltage is applied to a polymer-dispersed liquid crystal (PDLC) used in the LCD according to the present invention.

FIG. 3 is a view illustrating an operation when a voltage is not applied to the PDLC used in the LCD according to the present invention.

FIG. 4 is a view illustrating image display on a rear side by using light provided from a front light unit in the LCD according to the present invention.

FIG. 5 is a view illustrating image display on a front side by using light provided from the front light unit in the LCD according to the present invention.

FIG. 6 is a view illustrating image display on a front side by using an external light source in the LCD according to the present invention.

MODE FOR THE INVENTION

An embodiment of the present invention will now be described in detail with reference to accompanying drawings.

FIG. 1 is a conceptual view illustrating construction of an LCD according to the present invention.

The LCD according to the present invention, as illustrated in FIG. 1, includes a transmissive liquid crystal panel 100, a front light unit 170 providing a light for image display, and a micro lens sheet 160 receiving the light incident from the front light unit 170 and condensing the incident light on the transmissive liquid crystal panel 100.

Also, the LCD according to the present invention is characterized in that a light control unit 180 is provided at the rear of the transmissive liquid crystal panel 100. The light control unit 180 performs functions of reflecting or transmitting most of incident light transmitted through the transmissive liquid crystal panel 100. As one example of performing such functions, a polymer-dispersed liquid crystal (PDLC) can be used.

Several types of structures for the PDLC have been proposed such as dispersing a plurality of liquid crystal molecule particles in a high polymer or including liquid crystals in a net-shaped high polymer. As shown in FIGS. 2 and 3, the PDLC 190 transmits most of incident light when a voltage is applied between a first transparent electrode 191 and a second transparent electrode 192, and reflects most of incident light when a voltage is not applied between the first transparent electrode 191 and the second transparent electrode 192. Here, the PDLC 190 performs diffused-reflection on the incident light when the voltage is not applied. Reference numerals 193 and 195 denote a polymer binder and a liquid crystal, respectively.

The LCD according to the present invention may allow dual image display on both front and rear sides of the transmissive liquid crystal panel 100 as a front light unit 170 is provided in front of the transmissive liquid crystal panel 100.

That is, the LCD according to the present invention provides a first display mode in which the light control unit 180 re-reflects light transmitted through the transmissive liquid crystal panel 100, thereby displaying an image on a front side of the transmissive liquid crystal panel 100. Also, the LCD according to the present invention provides a second display mode in which the light control unit 180 transmits light transmitted through the transmissive liquid crystal panel 100, thereby displaying an image on a rear side of the transmissive liquid crystal panel 100.

Also, the LCD according to the present invention is characterized in that the microlens sheet 160 is provided on the transmissive liquid crystal panel 100.

The microlens sheet 160 serves to receive light incident thereon from the front light unit 170 and concentrate the incident light to an aperture of a pixel region constituting the transmissive liquid crystal panel 100. The microlens sheet 160 is a transparent film having a micro structure of a pixel unit and functions as a microlens array.

Here, the aperture is a region of a second substrate 120 constituting the transmissive liquid crystal panel 100 where a black matrix 121 is not formed, and a transparent electrode 111 is provided at a region of a first substrate 110 corresponding to the aperture.

Although not clearly shown in the drawing, the transparent electrode 111 is formed pixel by pixel which is the smallest unit implementing an image. Also, the transparent electrode 111 receives a voltage by a switching device controlling ON/OFF of a voltage, for example, a thin film transistor, thereby controlling light transmittance of a liquid crystal layer 130.

According to the present invention, as the microlens sheet 160 is provided on the transmissive liquid crystal panel 100, light incident upon the transmissive liquid crystal panel 100 can be concentrated to each aperture region and be made incident. Thusly, by the present invention, incident light can be more efficiently utilized as compared to the related art transmissive liquid crystal panel, and accordingly, the brightness of an image can be improved. Namely, by the present invention, the brightness can be improved without an increase in power consumption because the number of light sources provided in the front light unit may not be increased or power applied to light sources may not be increased.

Also, by the same principle, the microlens sheet 160 serves to concentrate light made incident thereon from an external light source to an aperture of the transmissive liquid crystal panel 100.

Such a microlens sheet 160 may be formed as a stripe type lenticular lens shape and be formed as a cylindrical lens shape.

Also, the microlens sheet 160 may be constructed such that lens shapes are formed at positions corresponding to pixel units constituting the transmissive liquid crystal panel 100, respectively. When such a microlens sheet 160 having a lens shape for each pixel unit is used, high-precision alignment is required in attachment thereof on a second polarization plate 150 as compared to the aforementioned another example because the alignment should be conducted such that a position of a unit lens corresponds to each pixel region. Here, each unit lens provided at the microlens sheet 160 may be formed in a spherical or aspherical shape. Also, each unit lens may be formed as a decentered lens shape.

The transmissive liquid crystal panel 100 includes a first substrate 110, a second substrate 120, a liquid crystal layer 130, a first polarization plate 140 and a second polarization plate 150. Because details of each constituent are well known, only schematic description thereon will be made in this specification.

The first substrate 110 includes an array device having a thin film transistor, and a transparent electrode 111 formed on the array device and transmitting incident light to display an image. The array device includes a plurality of gate lines formed in a first direction, a plurality of data lines formed perpendicularly to the gate lines, pixel regions defined by the gate lines and the data lines and thin film transistors formed at intersections of the gate lines and the data lines.

Also, the second substrate 120 is provided at a position facing the first substrate 110 and includes a color filter 123 formed at a position corresponding to a region of the first substrate 110 where the transparent electrode 111 is formed, a black matrix 121 formed between the color filters 123, and a common electrode (not shown) formed under the color filter 123.

A liquid crystal layer 130 is filled between the first substrate 110 and the second substrate 120, and a first polarization plate 140 and a second polarization plate 150 are provided under the first substrate 110 and on the second substrate 120, respectively.

Referring to FIGS. 4 through 6, a process of displaying an image on a front side and a rear side of a transmissive liquid crystal panel of the LCD having the aforementioned structure will now be described. Here, the case where a PDLC is used as a light control unit is described as reference.

First, referring to FIG. 4, the case where an image is displayed on a rear side of the liquid crystal panel by using light provided from the front light unit will now be described.

As illustrated in FIG. 4, the LCD according to the present invention may display an image on the rear side of the transmissive liquid crystal panel 100 by using light provided from a light source 171 of the front light unit 170. Here, as power is applied to the PDLC 190, the PDLC 190 transmits light made incident thereon from the transmissive liquid crystal panel 100, thereby allowing image display on the rear side of the transmissive liquid crystal panel 100.

The front light unit 170 has the light source 171 at its side, and the light source 171 may include a light-emitting diode (LED). Here, the LED may be a white LED or may be a red LED/green LED/blue LED. Also, the light source 171 may include a cold cathode fluorescent lamp (CCFL) or an external electrode fluorescent lamp (EEFL).

By the present invention, light provided from an external light source as well as light provided from the light source 171 of the front light unit 170 contributes to the image display on the rear side of the transmissive liquid crystal panel 100. Accordingly, the brightness of an image displayed on the rear side of the transmissive liquid crystal panel 100 may be further improved.

Next, referring to FIG. 5, the case where an image is displayed on a front side of the liquid crystal panel by using light provided from the front light unit will now be described.

As illustrated in FIG. 5, the LCD according to the present invention may display an image on the front side of the transmissive liquid crystal panel 100 by using light provided from the light source 171 of the front light unit 170. Here, power is not applied to the PDLC 190, and accordingly, the PDLC 190 reflects light made incident thereon from the transmissive liquid crystal panel 100, thereby allowing image display on the front side of the transmissive liquid crystal panel 100. Here, the PDLC 190 diffusely reflects light to make the light incident to the transmissive liquid crystal panel 100, and such diffused-reflection may provides advantageous effects in the view of reflectance as compared to the case where total reflection is carried out.

As illustrated in FIG. 6, an image may be displayed on the front side of the transmissive liquid crystal panel 100 by using light provided from an external light source such as sunlight or adjacent lighting devices (Here, power is not applied to the PDLC 190 and is thus in an opaque state.). Although not shown in the drawing, the LCD according to the present invention may allow image display on the rear side of the transmissive liquid crystal panel 100 by using light provided from the external light source (Here, power is applied to the PDLC 190 and is in a transparent state.).

That is, when the front light unit 170 is in an OFF state, dual image display can be carried out on the transmissive liquid crystal panel 100 upon using light made incident thereon from an external light source. Here, ambient light is concentrated to and made incident upon an aperture region of the transmissive liquid crystal panel 100 by the microlens sheet 160, thereby improving brightness of a displayed image.

The LCD having such a structure may be utilized as a dual display device. Accordingly, when the LCD according to the present invention is used for a mobile station (mobile communication terminal, PDA or the like), various image display functions may be implemented in the mobile station because dual image display can be carried out on both front and rear sides of the liquid crystal panel.

For example, if the LCD according to the present invention is used for a mobile station with a digital camera function, several users may observe an image of the same size and resolution from both sides of the mobile station.

INDUSTRIAL APPLICABILITY

The LCD according to the present invention is advantageous in that dual image display can be desirably carried out on front and rear sides of an liquid crystal panel by using one transmissive liquid crystal panel.

Also, the present invention is advantageous in that a thin mobile station can be provided that allows dual image display by using an LCD adopting one transmissive liquid crystal panel. For example, according to the present invention, because the PDLC may be manufactured with a thickness of 0.9 mm or less, an LCD module for dual image display may be made to be thin with a thickness of 3.5 mm or less.

The invention claimed is:

1. A liquid crystal display device comprising:
a transmissive liquid crystal panel;
a front light unit in front of the transmissive liquid crystal panel and capable of providing light for image display;
a light control unit at the rear of the transmissive liquid crystal panel and capable of reflecting and transmitting incident light;
wherein the light control unit includes a PDLC (Polymer-Dispersed Liquid Crystal),
wherein the transmissive liquid crystal panel includes a first substrate on the light control unit, a second substrate on the first substrate, a liquid crystal layer between the first substrate and the second substrate and a polarization plate between the first substrate and the light control unit, and
wherein the light control unit includes a first transparent electrode between the PDLC and the polarization plate and a second transparent electrode below the PDLC.

2. The liquid crystal display device according to claim 1, wherein the light control unit performs a first mode operation of displaying an image on a front side of the transmissive liquid crystal panel by re-reflecting light transmitted through the transmissive liquid crystal panel, and
wherein the light control unit performs a second mode operation of displaying an image on a rear side of the transmissive liquid crystal panel by transmitting light transmitted through the transmissive liquid crystal panel.

3. The liquid crystal display device according to claim 1, wherein the front light unit includes a light source.

4. The liquid crystal display device according to claim 3, wherein the light source is selected from an LED (Light-Emitting Diode), a CCFL (Cold Cathode Fluorescent Lamp), and an EEFL (External Electrode Fluorescent Lamp).

5. The liquid crystal display device according to claim 3, wherein the light source includes a white LED.

6. The liquid crystal display device according to claim 3, wherein the light source includes a red LED, a green LED and a blue LED.

7. The liquid crystal display device according to claim 1, wherein the first substrate comprises:
an array device having a thin film transistor and a first substrate transparent electrode formed at the array device and capable of transmitting incident light to display an image;
and wherein the second substrate is provided at a position facing the first substrate, wherein the second substrate includes:
a color filter formed at a position corresponding to a region of the first substrate where the first substrate transparent electrode is formed, and
a black matrix formed between color filters; and
wherein the liquid crystal layer is filled between the first substrate and the second substrate.

8. The liquid crystal display device according to claim 7, wherein the array device comprises:
a plurality of gate lines formed in a first direction;
a plurality of data lines formed perpendicularly to the gate lines;
pixel regions defined by the gate lines and the data lines; and
thin film transistors formed at intersections of the gate lines and the data lines.

9. The liquid crystal display device according to claim 7, wherein the second substrate further includes a common electrode formed under the color filter.

10. The liquid crystal display device according to claim 1, further comprising a microlens sheet upon which light incident from the front light unit is concentrated to the transmissive liquid crystal panel.

11. The liquid crystal display device according to claim 10, wherein the microlens sheet concentrates light incident thereupon from a light source to an aperture of the transmissive liquid crystal panel, the aperture being a region where a black matrix is not formed.

12. The liquid crystal display device according to claim 10, wherein the microlens sheet is formed as a lenticular lens or a cylindrical lens shape.

13. The liquid crystal display device according to claim 10, wherein the microlens sheet is formed such that lens shapes are formed at positions corresponding to pixel units of the transmissive liquid crystal panel, respectively.

14. The liquid crystal display device according to claim 13, wherein the lens shape is selected from spherical, aspherical, and decentered lens shapes.

15. The liquid crystal display device according to claim 1, further comprising a microlens sheet upon which light incident from the front light unit is concentrated to an aperture of a region constituting the transmissive liquid crystal panel.

16. The liquid crystal display device according to claim 1, wherein the PDLC transmits incident light when a voltage is applied thereto, and reflects the incident light when a voltage is not applied.

17. The liquid crystal display device according to claim 1, wherein the PDLC diffusedly reflects incident light when a voltage is not applied.

18. A mobile station comprising:
    an LCD including a transmissive liquid crystal panel, a front light unit in front of the transmissive liquid crystal panel and capable of providing light for image display, and a light control unit at the rear of the transmissive liquid crystal panel and capable of reflecting and transmitting incident light;
    a communication unit for communicating with an exterior; and
    a control unit controlling the communication unit and the image display of the LCD;
    wherein the light control unit includes a PDLC (Polymer-Dispersed Liquid Crystal),
    wherein the transmissive liquid crystal panel includes a first substrate on the light control unit, a second substrate on the first substrate, a liquid crystal layer between the first substrate and the second substrate and a polarization plate between the first substrate and the light control unit,
    wherein the light control unit includes a first transparent electrode between the PDLC and the polarization plate and a second transparent electrode below the PDLC.

19. The mobile station according to claim 18, wherein the light control unit performs a first mode operation of displaying an image on a front side of the LCD by re-reflecting light transmitted through the transmissive liquid crystal panel, and
    wherein the light control unit performs a second mode operation of displaying an image on a rear side of the LCD by transmitting light transmitted through the transmissive liquid crystal panel.

20. The mobile station according to claim 18, wherein the first substrate comprises:
    an array device having a thin film transistor and a first substrate transparent electrode formed at the array device and capable of transmitting incident light to display an image;
    wherein the second substrate is provided at a position facing the first substrate, wherein the second substrate includes:
    a color filter formed at a position corresponding to a region of the first substrate where the first substrate transparent electrode is formed, and
    a black matrix formed between color filters; and
    wherein the liquid crystal layer is filled between the first substrate and the second substrate.

21. The mobile station according to claim 18, further comprising a microlens sheet upon which light incident from the front light unit is concentrated to the transmissive liquid crystal panel.

22. The mobile station according to claim 21, wherein the microlens sheet concentrates light incident thereon from a light source to an aperture of the transmissive liquid crystal panel, the aperture being a region where a black matrix is not formed.

23. The mobile station according to claim 21, wherein the microlens sheet is formed in a lenticular lens or a cylindrical lens shape.

24. The mobile station according to claim 21, wherein the microlens sheet is formed such that lens shapes are formed at positions corresponding to pixel units of the transmissive liquid crystal panel, respectively.

25. The mobile station according to claim 24, wherein the lens shape is selected from spherical, aspherical, and decentered lens shapes.

26. The mobile station according to claim 18, further comprising a microlens sheet upon which light incident from the front light unit is concentrated to an aperture of a region constituting the transmissive liquid crystal panel.

27. The mobile station according to claim 18, wherein the PDLC transmits incident light when a voltage is applied thereto, and reflects the incident light when a voltage is not applied.

28. The mobile station of claim 18, wherein the PDLC diffusedly reflects incident light when a voltage is not applied.

* * * * *